(No Model.) 2 Sheets—Sheet 1.
P. BEUERLEIN.
ARTIFICIAL MOTHER.
No. 335,422. Patented Feb. 2, 1886.
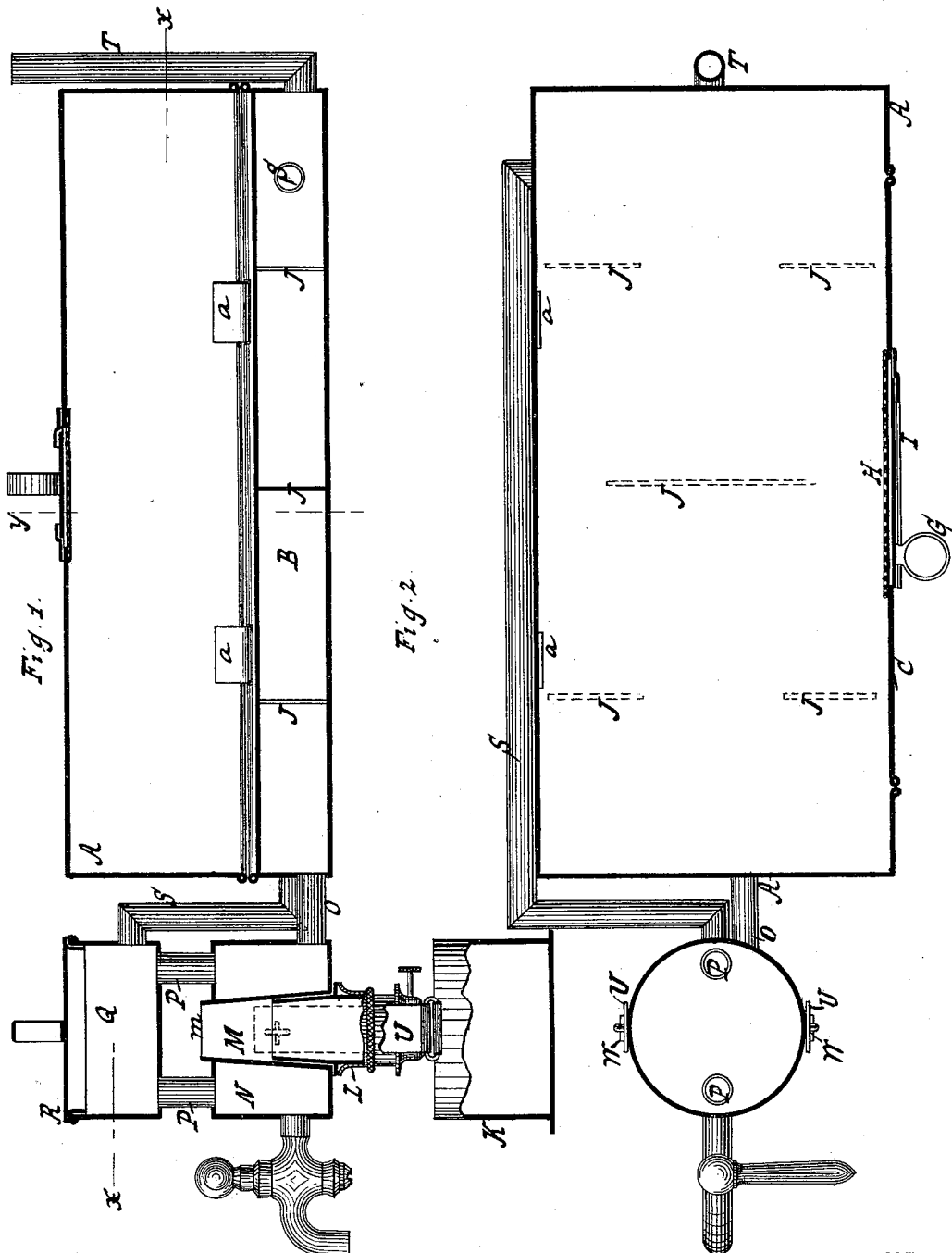
WITNESSES:
William Miller
A Faber du Faur
INVENTOR
Peter Beuerlein
BY
Van Santvoord & Hauff
his ATTORNEYS (No Model.)  2 Sheets—Sheet 2.
P. BEUERLEIN.
ARTIFICIAL MOTHER.
No. 335,422. Patented Feb. 2, 1886.
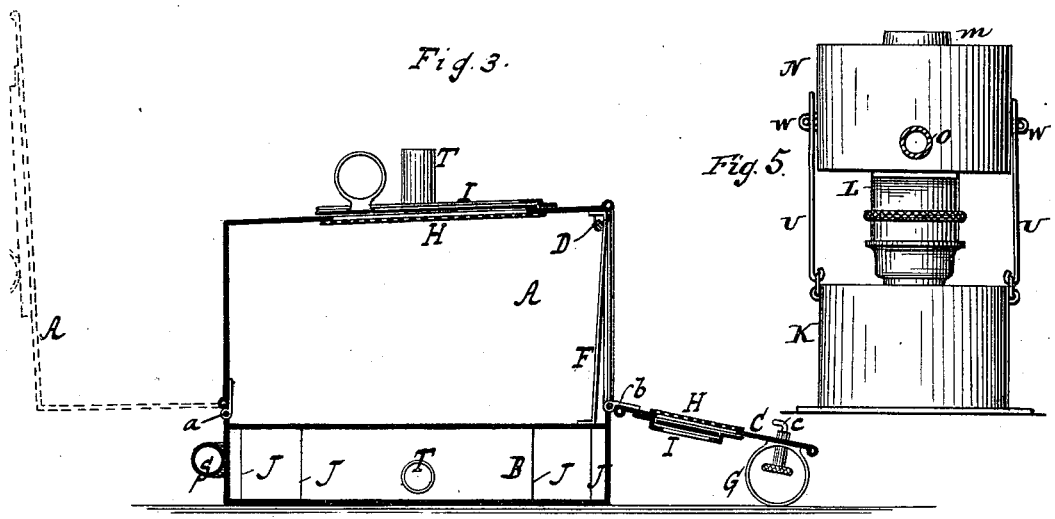
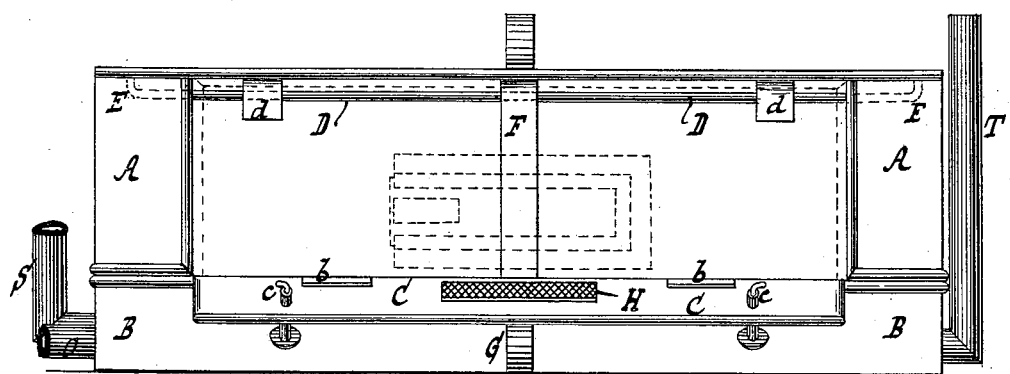
WITNESSES:  
William Miller  
A. Faber du Faur
INVENTOR  
Peter Beuerlein  
BY  
VanSantvoord & Hauff  
his ATTORNEYS

UNITED STATES PATENT OFFICE.

PETER BEUERLEIN, OF NEWTOWN, NEW YORK.

ARTIFICIAL MOTHER.

SPECIFICATION forming part of Letters Patent No. 335,422, dated February 2, 1886.

Application filed September 3, 1885. Serial No. 176,107. (No model.)

*To all whom it may concern:*

Be it known that I, PETER BEUERLEIN, a citizen of the United States, residing at Newtown, in the county of Queens and State of New York, have invented new and useful Improvements in Artificial Mothers, of which the following is a specification.

This invention relates to artificial mothers for raising young chickens; and it consists in various improvements in construction and arrangement, in connection with a house or chamber where the chickens are sheltered, arranged over a water-chamber through which warm water circulates, so as to warm the floor of the house. The front of the house is provided with a door which opens downward, so that when it is open it provides a path by which the chickens can leave or enter the house. The frame of the house is hinged to the water-chamber in such a manner as to permit its being thrown back and thus uncover and expose the floor, so that it may be cleaned from excreta and other matters.

The particular features of my invention are hereinafter described, reference being had to the accompanying drawings, in which—

Figure 1 is a vertical longitudinal section of the device. Figure 2 is a horizontal section taken on the line $x\ x$ of Fig. 1. Fig. 3 is a vertical cross-section through the device on the line $y\ y$ of Fig. 1. Fig. 4 is a front view of the body of the device, the door being open. Fig. 5 shows the lamp and water-vessel N and the devices which connect them to each other detached.

Similar letters indicate corresponding parts.

The letter A designates that part of the device which I name "house," being the part where the chickens are placed and where they are sheltered. It consists of a frame open at bottom and partly open at front to receive a door, said frame being set on and hinged along the lower edge of its back by hinges at $a\ a$ to the rear of a water-chamber, B, which consists of a vessel closed on all sides, except as it has openings and pipes, as hereinafter described.

The frame of the house A may be of any desired shape. It has in this example the general form in plan of a parallelogram. Its top inclines downward from front to rear, so as to shed the rain, and the greater part of the front side is open. The door C, which closes the opening in the front, is hinged to the front of the water-chamber by hinges $b\ b$, so that when opened the door can be laid down upon the ground, as shown in Figs. 3 and 4, and form an inclined path for the chickens in and out of the house. When closed, the door is fastened to the frame of the house by catches $c\ c$, which engage plates $d\ d$, that depend from the upper edge of the doorway, as shown in Fig. 4, and which serve also as stops to prevent the door from being pushed too far into the house. In the upper part of the doorway I have placed a wire bar, D, which extends along the doorway and is supported in the upper part of the frame at E E. The office of this bar is to support a curtain, Y, that hangs down free in the doorway, so as to protect the chickens in the house from cold air and wind and storms, and yet allow the chickens to pass in and out by pushing aside the edges or bottom of the curtain. In the middle of the doorway is an upright bar, F, which rises from the front edge of the water-chamber and hooks over the bar D. This bar F serves as a rest and stop to the door to prevent it from being crowded into the house-frame, and serves also as a bearing to support the top of the frame A.

G is a finger-piece for handling the door.

The door C is provided with perforations H to admit the passage of air when the door is closed, and the top of the frame is provided with like perforations, as shown in the drawings, and the perforated portions are provided with slides I, by which to cover them (more or less) in bad weather.

The water-chamber B is arranged so that its upper side forms the floor of the house, on which the chickens are placed. Its upper side is supported against the weight of the chickens by vertical plates J, so arranged as to promote the circulation of the water through different parts of the chamber. These plates J are secured in place by solder or any suitable means. The water in the device is heated by means of a lamp; but other means for heating it can be employed. In this example I employ a lamp, K, whose position relative to the device is lower than the water-chamber, so that when the device is placed on the ground, as indicated in the drawings, an excavation must be made in the ground to receive the lamp. The lamp-chimney L, which may be made of metal, projects upward into a central opening, M, formed in a vessel, N, which is connected by a horizontal pipe, O, with the water-chamber B. The vessel N is provided with a discharge-faucet. On the upper part of the vessel N is a flange, m, forming an extension of the opening M, which serves to deflect the wind and prevent it from putting out the flame of the lamp.

From the top of the vessel N rise pipes P, which extend upward into an upper distributing water-chamber, Q, which is provided with a movable cover, R. From the side of the chamber Q proceeds a pipe, S, which extends downward to the level of the water-chamber B, along the rear of which it is carried almost to the farther end of chamber B, when it enters the chamber, as shown.

From one end of the water-chamber B rises a pipe, T, which extends upward a little above the level of the upper chamber, Q, and has its upper end open to the air. The open pipe T prevents the pressure from the heated water in the device from becoming excessive, by allowing the escape of steam which may be formed in the device.

In supplying water to the device I close the discharge-faucet and remove the cover of vessel Q and pour into it water until the water-chamber B and vessel N and their connecting-pipes are full, and until the water stands in the vessel Q above the mouth of the pipe S, when the cover is replaced. On lighting the lamp, or otherwise heating the water in vessel N, a circulation of the water will take place through the device, and the floor of the house and its atmosphere will be warmed. When it is desired to clean the floor of the house, I open the door to the position shown in Fig. 3, and open the hinged frame of the house to the position shown by dotted lines in the same figure, and thereby expose the whole surface of the floor, so that it can be easily cleaned. The lamp is connected to the vessel by suspension-bars U, which are hinged to the lamp on opposite sides, and which have at their free ends slots V, which hook over catches W formed on the sides of the vessel N. By these means the lamp is readily attached to and removed from the device. The upper ends of the bars U are shown in dotted lines in Fig. 1.

In Fig. 4 the door is shown open and resting on the ground, and is also by dotted lines in the same figure shown closed.

What I claim as new, and desire to secure by Letters Patent, is—

1. In an artificial mother, the combination of the frame A and the door C, constituting the house of shelter, with the water-chamber B, and hinges $a\ a$ and $b\ b$ for connecting the frame and door to the chamber, substantially as described.

2. The combination of the water-chamber B, the connected vessels N and Q, the pipes O S, and the open pipe T, with the house A and door C, substantially as described.

3. In an artificial mother, the combination of the frame A and the hinged downwardly-swinging door C, constituting the house of shelter, with the chamber B, the horizontal bar D, arranged across the upper portion of the door-opening, and the curtain Y, hung freely from the bar, substantially as and for the purpose described.

4. In an artificial mother, the combination of the chamber B with the frame A, and the door C, constituting the house of shelter, and connected with the chamber, said frame and door being each provided with perforations H and a slide, I, substantially as described.

5. The water-vessel N, having the opening M formed in it, and provided with the side catches, W W, in combination with the lamp K, lamp-chimney L, and the suspension-bars U U, substantially as described.

In testimony whereof I have hereunto set my hand and seal in the presence of two subscribing witnesses.

PETER BEUERLEIN. [L. S.]

Witnesses:
A. FABER DU FAUR, Jr.,
E. F. KASTENHUBER.